(12) United States Patent
Roberts et al.

(10) Patent No.: US 10,577,096 B2
(45) Date of Patent: Mar. 3, 2020

(54) PROPROTOR FLAPPING CONTROL SYSTEMS FOR TILTROTOR AIRCRAFT

(71) Applicant: Textron Innovations Inc., Providence, RI (US)

(72) Inventors: Brad John Roberts, Fort Worth, TX (US); Paul David Ruckel, Fort Worth, TX (US)

(73) Assignee: Textron Innovations Inc., Providence, RI (US)

(*) Notice: Subject to any disclaimer, the term of this patent is extended or adjusted under 35 U.S.C. 154(b) by 475 days.

(21) Appl. No.: 15/654,926

(22) Filed: Jul. 20, 2017

(65) Prior Publication Data

US 2019/0023388 A1 Jan. 24, 2019

(51) Int. Cl.

| | |
|---|---|
| *B64D 1/12* | (2006.01) |
| *B64C 27/72* | (2006.01) |
| *B64C 27/26* | (2006.01) |
| *B64C 27/28* | (2006.01) |
| *B64C 27/52* | (2006.01) |
| *B64C 27/57* | (2006.01) |
| *B64C 27/605* | (2006.01) |
| *B64C 29/00* | (2006.01) |

(52) U.S. Cl.
CPC ............. *B64C 27/72* (2013.01); *B64C 27/26* (2013.01); *B64C 27/28* (2013.01); *B64C 27/52* (2013.01); *B64C 27/57* (2013.01); *B64C 27/605* (2013.01); *B64C 29/0033* (2013.01); *B64C 2027/7238* (2013.01)

(58) Field of Classification Search
CPC ... B64C 27/72; B64C 29/0033; B64C 27/605; B64C 27/57; B64C 27/52; B64C 27/28; B64C 27/26; B64C 2027/7238; B64C 27/54; B64C 27/08; B64D 43/00
See application file for complete search history.

(56) References Cited

U.S. PATENT DOCUMENTS

| | | | |
|---|---|---|---|
| 2,670,051 A | * | 2/1954 | Hohenemser ........... B64C 27/54 416/102 |
| 6,616,095 B2 | | 9/2003 | Stamps et al. |

(Continued)

OTHER PUBLICATIONS

European Search Report; Application No. EP17185921.8; European Patent Office; dated Mar. 20, 2018.

*Primary Examiner* — Assres H Woldemaryam

(74) *Attorney, Agent, or Firm* — Lawrence Youst PLLC

(57) ABSTRACT

A flapping control system for a proprotor assembly of a tiltrotor aircraft includes one or more sensors operable to detect one or more flight parameters of the tiltrotor aircraft to form sensor data. The sensors include a proprotor flapping sensor to detect a proprotor flapping measurement. The flapping control system includes a flapping control module in data communication with the sensors. The flapping control module includes a maneuver detection module to detect whether the tiltrotor aircraft is in a maneuver mode using the sensor data. The flapping control module identifies a maneuver flapping threshold associated with the maneuver mode. The flapping control module generates a swashplate command using the proprotor flapping measurement and the maneuver flapping threshold, and sends the swashplate command to the proprotor assembly to reduce flapping of the proprotor assembly.

21 Claims, 5 Drawing Sheets

(56) References Cited

U.S. PATENT DOCUMENTS

| | | | |
|---|---|---|---|
| 8,357,023 B2* | 1/2013 | Van de Rostyne | A63H 27/12 244/17.11 |
| 8,662,442 B2 | 3/2014 | Stamps et al. | |
| 8,991,745 B1* | 3/2015 | Khan | B64C 27/52 244/17.11 |
| 9,464,958 B2* | 10/2016 | Shue | G01M 1/127 |
| 9,682,767 B2 | 6/2017 | Fortenbaugh | |
| 2002/0018009 A1* | 2/2002 | Rast | B64D 47/04 340/961 |
| 2002/0134883 A1* | 9/2002 | Stamps | B64C 27/08 244/7 R |
| 2013/0015289 A1 | 1/2013 | Fortenbaugh et al. | |
| 2013/0105637 A1* | 5/2013 | Stamps | B64C 29/0033 244/76 R |
| 2015/0175254 A1* | 6/2015 | Fortenbaugh | B64C 27/57 415/118 |
| 2016/0257399 A1* | 9/2016 | Carter, Jr. | B64C 27/26 |

* cited by examiner

PROPROTOR FLAPPING CONTROL SYSTEMS FOR TILTROTOR AIRCRAFT

TECHNICAL FIELD OF THE DISCLOSURE

The present disclosure relates, in general, to flapping control systems for use on rotorcraft and, in particular, to proprotor flapping control systems that control the flapping motion of proprotor assemblies during or in anticipation of the performance of a flight maneuver by a tiltrotor aircraft.

BACKGROUND

Tiltrotor aircraft typically include multiple propulsion assemblies that are positioned near the outboard ends of a wing. Each propulsion assembly may include an engine and transmission that provides torque and rotational energy to a drive shaft that rotates a proprotor assembly including a hub assembly and a plurality of proprotor blades. Typically, a pylon assembly, which includes the proprotor assembly, is rotatable relative to the wing such that the proprotor blades form a generally horizontal proprotor disk providing vertical lift for takeoff, hovering and landing, much like a conventional helicopter, and a generally vertical proprotor disk providing forward thrust for cruising in forward flight with the wing providing lift, much like a conventional propeller driven airplane. In addition, tiltrotor aircraft can be operated in configurations between the helicopter flight mode and the airplane flight mode, which may be referred to as conversion flight mode. Often, the proprotor blades of a proprotor assembly are designed to flap and/or teeter out of the plane of the proprotor disk. Proprotor blade flapping helps to reduce the transmission of loads from the proprotor disk to the mast, thereby reducing the need for a large and heavy mast. Proprotor blades typically flap at particular frequencies in such a way that the proprotor disk appears to tilt at various angles relative to the mast.

Flapping controllers and control power limiting systems may be used to control proprotor blade flapping. For example, in helicopter flight mode, a flapping controller may position the swashplates of the proprotor assemblies such that each proprotor disk is tilted at a suitable steady state, or trim, angle to maintain a vertical thrust vector while hovering. Also, in steady state helicopter flight mode, the proprotor blades may have a tendency to flap such that the proprotor disks are tilted in the outboard direction, in which case a flapping controller may command the swashplates of the proprotor assemblies to tilt such that the proprotor disks return to a 0 degree or slightly inboard-facing flapping angle. Flapping controllers and control power limiting systems often operate without direct input from the pilot so that the pilot can perform other tasks.

While a tiltrotor aircraft is in a steady state mode, aerodynamic forces will often prevent the proprotor blades from flapping excessively. When a tiltrotor aircraft performs a maneuver, however, atmospheric, aerodynamic and other factors such as uneven airflow create loads on the proprotor disk that can cause the proprotor blades to flap at greater angles than in steady state mode. An excessive flapping angle can be problematic particularly when the tiltrotor aircraft is in airplane mode because lateral flapping can cause an inboard proprotor blade to contact the forward edge of the wing, which can lead to severe or catastrophic structural damage. Current flapping controllers and control power limiting systems fail to take full advantage of a tiltrotor aircraft's sensory capabilities and thus fail to take into account whether the tiltrotor aircraft is performing a maneuver, which is when the proprotor blades are most likely to experience excessive flapping.

SUMMARY

In a first aspect, the present disclosure is directed to a flapping control system for a proprotor assembly of a tiltrotor aircraft including one or more sensors operable to detect one or more flight parameters of the tiltrotor aircraft to form sensor data. The sensors include a proprotor flapping sensor to detect a proprotor flapping measurement. The flapping control system includes a flapping control module in data communication with the sensors. The flapping control module includes a maneuver detection module to detect whether the tiltrotor aircraft is in a maneuver mode using the sensor data. The flapping control module identifies a maneuver flapping threshold associated with the maneuver mode. The flapping control module generates a swashplate command using the proprotor flapping measurement and the maneuver flapping threshold, and sends the swashplate command to the proprotor assembly to reduce flapping of the proprotor assembly.

In some embodiments, the sensors may include a roll rate sensor, a pitch rate sensor, a yaw rate sensor, a normal acceleration sensor, a blowback flapping sensor, an airspeed sensor and/or the proprotor flapping sensor. In certain embodiments, the maneuver detection module may detect that the tiltrotor aircraft is in the maneuver mode in response to anticipating performance of a maneuver by the tiltrotor aircraft using the sensor data. In some embodiments, the maneuver detection module may identify a proportional relationship between one or more flight parameters of the sensor data and flapping of the proprotor assembly, and the flapping control module may generate the swashplate command using the proportional relationship. In certain embodiments, the maneuver flapping threshold may include a longitudinal component and a lateral component. The longitudinal maneuver flapping threshold may differ from the lateral maneuver flapping threshold. For example, the lateral maneuver flapping threshold may be less than the longitudinal maneuver flapping threshold. In some embodiments, the lateral maneuver flapping threshold may include inboard and outboard components and the inboard lateral maneuver flapping threshold may be less than the outboard lateral maneuver flapping threshold.

In certain embodiments, the flapping control module may determine a flapping error using the proprotor flapping measurement and the maneuver flapping threshold and may generate the swashplate command using the flapping error. In some embodiments, the flapping control module may generate the swashplate command using the sensor data. In certain embodiments, the flapping control module may identify a proportional control gain and generate the swashplate command using the proportional control gain. In some embodiments, the flapping control module may identify an integral control gain and generate the swashplate command using the integral control gain. In certain embodiments, the flapping control module may identify the proportional control gain and the integral control gain based on the sensor data. In some embodiments, the flapping control module may be implemented by a flight control computer, and the flight control computer may send the swashplate command to the proprotor assembly to reduce flapping of the proprotor assembly. In certain embodiments, the proprotor assembly may include a swashplate assembly and a plurality of proprotor blade assemblies, and the flapping control module may send the swashplate command to the swashplate assembly to reduce flapping of the proprotor blade assemblies. In some embodiments, the swashplate command may reduce the flapping of the proprotor assembly to equal or less than the maneuver flapping threshold.

In a second aspect, the present disclosure is directed to a tiltrotor aircraft including a fuselage, a wing coupled to the fuselage and at least one propulsion assembly coupled to the wing. Each propulsion assembly includes a proprotor assembly. The tiltrotor aircraft includes one or more sensors to detect one or more flight parameters of the tiltrotor aircraft to form sensor data. The sensors include a proprotor flapping sensor to detect a proprotor flapping measurement. The tiltrotor aircraft includes a flight control computer including a flapping control module in data communication with the sensors. The flapping control module includes a maneuver detection module to detect whether the tiltrotor aircraft is in a maneuver mode using the sensor data. The flapping control module identifies a maneuver flapping threshold associated with the maneuver mode. The flapping control module generates a swashplate command using the proprotor flapping measurement and the maneuver flapping threshold, and sends the swashplate command to the proprotor assembly to reduce flapping of the proprotor assembly.

In some embodiments, the propulsion assembly may include a pylon assembly movable between a vertical orientation in helicopter mode and a horizontal orientation in airplane mode, the pylon assembly may include the proprotor assembly and the proprotor assembly may include a plurality of proprotor blade assemblies. In such embodiments, the flapping control module may reduce flapping of the proprotor blade assemblies while the tiltrotor aircraft is in the airplane mode to prevent contact between the proprotor blade assemblies and the wing. In certain embodiments, the proprotor assembly may include a plurality of proprotor blade assemblies, and the proprotor flapping sensor may measure a flapping angle of the proprotor blade assemblies to form the proprotor flapping measurement. In some embodiments, the maneuver detection module may detect whether the tiltrotor aircraft is in steady state mode or maneuver mode. In certain embodiments, the wing may include first and second outboard ends respectively having first and second propulsion assemblies coupled thereto and the flapping control module may reduce flapping of the proprotor assemblies for the first and second propulsion assemblies.

In a third aspect, the present disclosure is directed to a method for controlling flapping of a proprotor assembly of a tiltrotor aircraft including receiving a proprotor flapping measurement from a proprotor flapping sensor; identifying a maneuver flapping threshold in response to detecting that the tiltrotor aircraft is in a maneuver mode; determining a flapping error using the proprotor flapping measurement and the maneuver flapping threshold; determining a swashplate command using the flapping error; and sending the swashplate command to the proprotor assembly to reduce flapping of the proprotor assembly.

In some embodiments, identifying the maneuver flapping threshold may include identifying either or both of a longitudinal maneuver flapping threshold or a lateral maneuver flapping threshold; detecting that the tiltrotor aircraft is in the maneuver mode may include detecting that the tiltrotor aircraft is in the maneuver mode using sensor data from one or more sensors; detecting that the tiltrotor aircraft is in the maneuver mode may include anticipating the maneuver mode using sensor data from one or more sensors; determining the swashplate command may include determining the swashplate command using sensor data from one or more sensors; or determining the swashplate command may include determining the swashplate command using a proportional control gain and an integral control gain. The method may include determining either or both of the proportional control gain or the integral control gain using sensor data from one or more sensors; or identifying a proportional relationship between flapping of the proprotor assembly and one or more parameters of sensor data from one or more sensors, wherein determining the swashplate command may include determining the swashplate command based on the proportional relationship. In certain embodiments, sending the swashplate command may include sending the swashplate command to a swashplate assembly to reduce flapping of proprotor blade assemblies; or sending the swashplate command to the proprotor assembly to reduce flapping of the proprotor assembly may include sending the swashplate command to the proprotor assembly to reduce the flapping error to substantially zero.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1A:
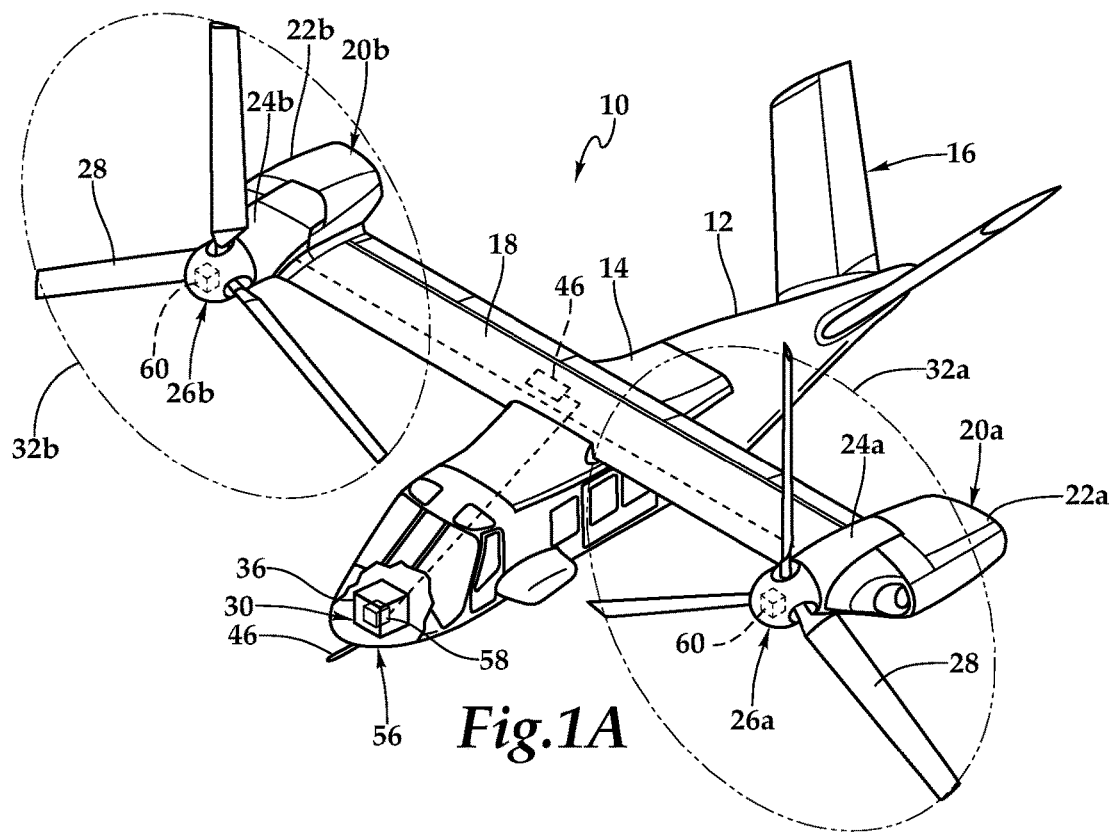
FIGS. 1A-1D are schematic illustrations of a tiltrotor aircraft implementing a flapping control system in accordance with embodiments of the present disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Referring to FIGS. 1A-1D and 2 in the drawings, a tiltrotor aircraft is schematically illustrated and generally designated 10. Tiltrotor aircraft 10 includes a fuselage 12, a wing mount assembly 14 that is rotatable relative to fuselage 12 and a tail assembly 16 having control surfaces operable for horizontal and/or vertical stabilization during forward flight. A wing 18 is supported by wing mount assembly 14 and rotates with wing mount assembly 14 relative to fuselage 12 to enable tiltrotor aircraft 10 to convert to a storage configuration. Together, fuselage 12, tail assembly 16 and wing 18 as well as their various frames, supports, longerons, stringers, bulkheads, spars, ribs and skins may be considered to be the airframe of tiltrotor aircraft 10.

Figure 1B:
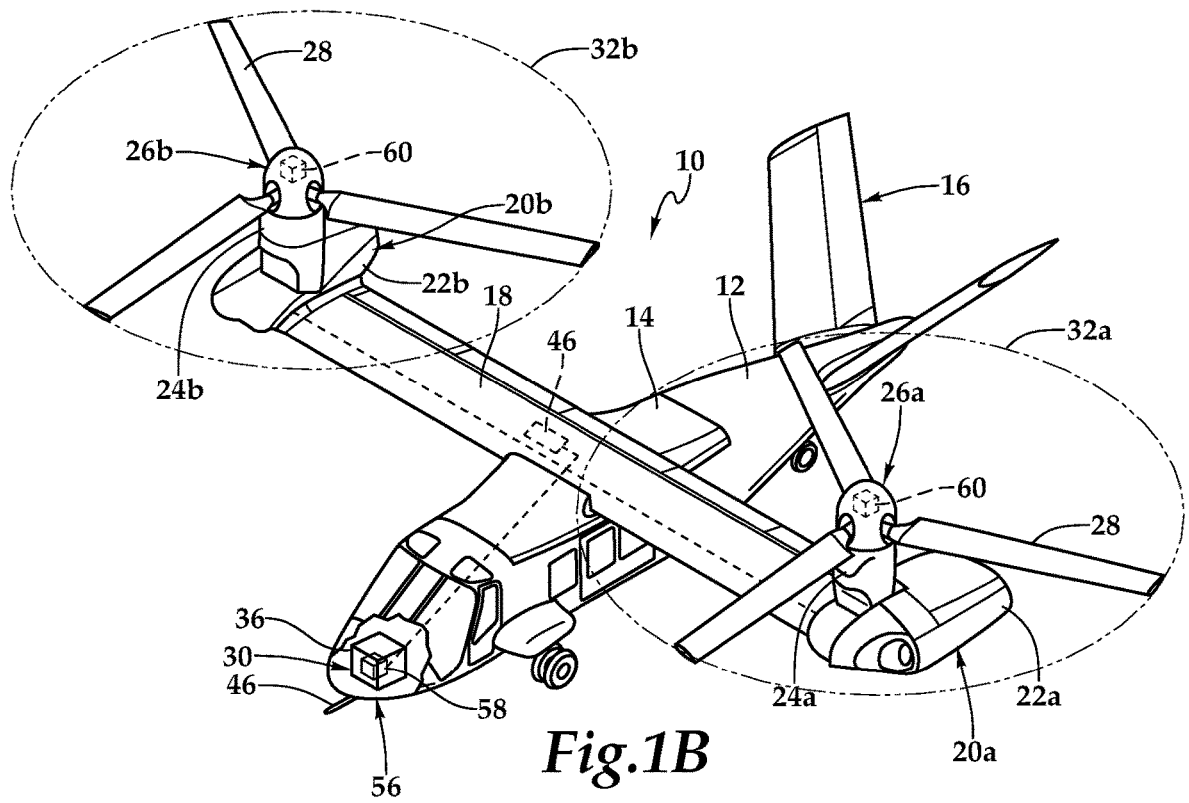

Coupled to the outboard ends of wing 18 are propulsion assemblies 20a, 20b. Propulsion assemblies 20a, 20b include fixed nacelles 22a, 22b, respectively, each of which preferably houses an engine and a fixed portion of a drive system. A pylon assembly 24a is rotatable relative to fixed nacelle 22a and wing 18 between a generally horizontal orientation, as best seen in FIG. 1A, and a generally vertical orientation, as best seen in FIG. 1B. Pylon assembly 24a includes a rotatable portion of the drive system and a proprotor assembly 26a that is rotatable responsive to torque and rotational energy provided via the engine and drive system. Likewise, a pylon assembly 24b is rotatable relative to fixed nacelle 22b and wing 18 between a generally horizontal orientation, as best seen in FIG. 1A, and a generally vertical orientation, as best seen in FIG. 1B. Pylon assembly 24b includes a rotatable portion of the drive system and a proprotor assembly 26b that is rotatable responsive to torque and rotational energy provided via the engine and drive system. In the illustrated embodiment, proprotor assemblies 26a, 26b each include three proprotor blade assemblies 28. It should be understood by those having ordinary skill in the art, however, that proprotor assemblies 26a, 26b could alternatively have a different number of proprotor blades, either less than or greater than three. In addition, it should be understood that the position of pylon assemblies 24a, 24b, the angular velocity or revolutions per minute (RPM) of proprotor assemblies 26a, 26b, the pitch of proprotor blades 28 and the like may be controlled by the pilot of tiltrotor aircraft 10 and/or a flight control system 30 to selectively control the direction, thrust and lift of tiltrotor aircraft 10 during flight. As used herein, the term "coupled" may include direct or indirect coupling by any means, including moving and/or non-moving mechanical connections.

FIG. 1A illustrates tiltrotor aircraft 10 in a forward flight mode or airplane flight mode, in which proprotor assemblies 26a, 26b are positioned to rotate in a substantially vertical plane to form substantially vertical proprotor disks 32a, 32b and provide a forward thrust while a lifting force is supplied by wing 18 such that tiltrotor aircraft 10 flies much like a conventional propeller driven aircraft. FIG. 1B illustrates tiltrotor aircraft 10 in a vertical takeoff and landing (VTOL) flight mode or helicopter flight mode, in which proprotor assemblies 26a, 26b are positioned to rotate in a substantially horizontal plane to form substantially horizontal proprotor disks 32a, 32b and provide a vertical thrust such that tiltrotor aircraft 10 flies much like a conventional helicopter. During operation, tiltrotor aircraft 10 may convert from helicopter flight mode to airplane flight mode following vertical takeoff and/or hover. Likewise, tiltrotor aircraft 10 may convert back to helicopter flight mode from airplane flight mode for hover and/or vertical landing. In addition, tiltrotor aircraft 10 can perform certain flight maneuvers with proprotor assemblies 26a, 26b positioned between airplane flight mode and helicopter flight mode, which can be referred to as conversion flight mode.

Preferably, each fixed nacelle 22a, 22b houses a drive system, such as an engine and transmission, for supplying torque and rotational energy to a respective proprotor assembly 26a, 26b. In such embodiments, the drive systems of each fixed nacelle 22a, 22b may be coupled together via one or more drive shafts located in wing 18 such that either drive system can serve as a backup to the other drive system in the event of a failure. Alternatively or additionally, fuselage 12 may include a drive system, such as an engine and transmission, for providing torque and rotational energy to each proprotor assembly 26a, 26b via one or more drive shafts located in wing 18. In tiltrotor aircraft having both nacelle and fuselage mounted drive systems, the fuselage mounted drive system may serve as a backup drive system in the event of failure of either or both of the nacelle mounted drive systems. Proprotor assemblies 26a, 26b may be gimbaled, or teetering, proprotors that allow proprotor blades 28 to flap into and out of the plane formed by proprotor disks 32a, 32b to change angle relative their respective masts, which relieves the masts, such as mast 34 of pylon assembly 24a, of loads acting across proprotor disks 32a, 32b during flight and therefore allows for lighter and less stiff masts.

Figure 2:
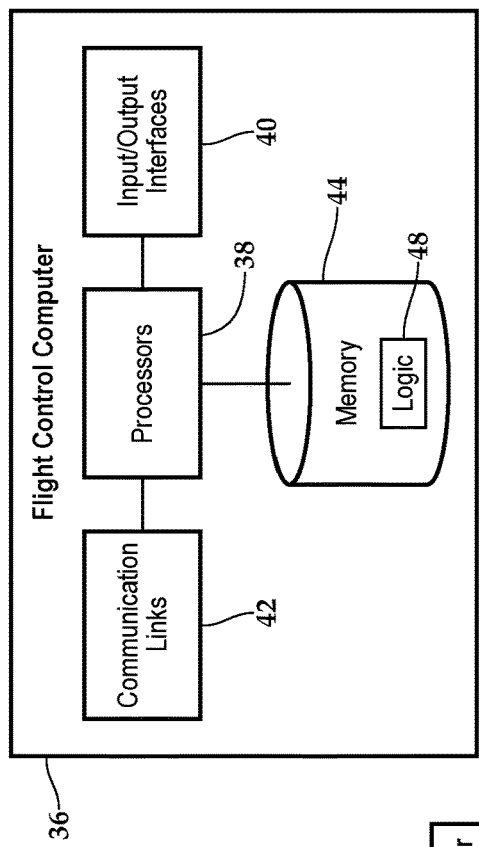
FIG. 2 is a schematic illustration of a flight control computer in accordance with embodiments of the present disclosure.

Tiltrotor aircraft 10 may be a fly-by-wire tiltrotor aircraft that utilizes a flight control computer 36 as part of flight control system 30. As best seen in FIG. 2, flight control computer 36 may include one or more processors 38, input/output (I/O) interfaces 40, communication links 42 and memory 44. In other embodiments, flight control computer 36 may include more, less or other components. Flight control computer 36 may be operable to perform one or more operations of the illustrative embodiments described herein, although the illustrative embodiments may also be implemented using computers other than flight control computer 36, including computers onboard or not onboard tiltrotor aircraft 10. The illustrative embodiments may also employ multiple flight control computers 36 or other computers networked together in one or more public and/or private computer networks.

Processors 38 may be devices operable to execute logic contained within a medium, such as memory 44. Non-limiting examples of processors 38 include one or more microprocessors, one or more nanoprocessors, one or more applications and/or other logic. Input/output interfaces 40 may include any device or interface operable to enable communication between flight control computer 36 and users, such as a pilot of tiltrotor aircraft 10 or ground control personnel. Non-limiting examples of input/output interfaces 40 include a mouse, keyboard, mobile devices, displays such as touch-screen displays or printers.

Communication links 42 are operable to facilitate communication between flight control computer 36 and other elements of tiltrotor aircraft 10, such as other flight control computers, a pilot inceptor, sensors 46 or other systems. Communication links 42 may also facilitate communication with systems not onboard tiltrotor aircraft 10, such as ground network computers, satellites or a computing cloud. Communication links 42 may connect to any number and combination of wired or wireless networks, data buses, data transmission conduits, electrical buses or electrical conduits suitable for data or electrical signal transmission. Communication links 42 may, for example, communicate audio or video signals, electrical voltages or currents, internet protocol packets, frame relay frames, asynchronous transfer mode cells or other data between network addresses. Communication links 42 may be configured to connect to a computer network or a variety of other communicative platforms including, but not limited to, a public switched telephone network (PSTN), a public or private data network, one or more intranets, a local area network (LAN), a metropolitan area network (MAN), a wide area network (WAN), a wired or wireless network, a local, regional or global communication network, an optical network, a satellite network, a cellular network, an enterprise intranet, the Internet, other suitable network interfaces or any combination thereof.

Memory 44 may be any suitable storage medium and store any data for use by flight control computer 36. Memory 44 may include one or more tangible, computer-readable or computer-executable storage media. Non-limiting examples of memory 44 include computer memory such as random access memory (RAM) or read only memory (ROM), mass storage media such as a hard disk, removable storage media such as a compact disk, flash drive or a digital video disk (DVD), database or network storage such as a server or other computer-readable media. Memory 44 can also store data such as schedules or look-up tables used in the operation of the illustrative embodiments. In some embodiments, memory 44 stores logic 48. Logic 48 facilitates operation of flight control computer 36 and other systems of tiltrotor aircraft 10. Logic 48 may perform operations when executed by flight control computer 36. For example, logic 48 may include a computer program, hardware, software, firmware, control laws (CLAWs), computer-executable instructions or any other instructions or logic capable of being executed by flight control computer 36. The operations of the illustrative embodiments, including the operations of the various modules of flight control computer 36, may be performed by processors 38 based at least in part on logic 48 stored in memory 44. Logic 48 may also be embedded within any other suitable medium without departing from the scope of the illustrative embodiments.

Figure 1C:
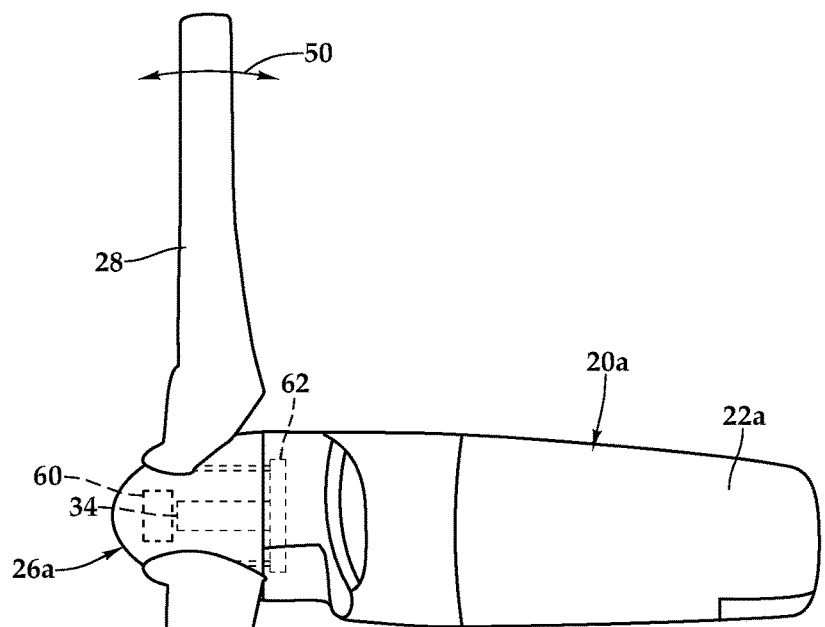
Figure 1D:
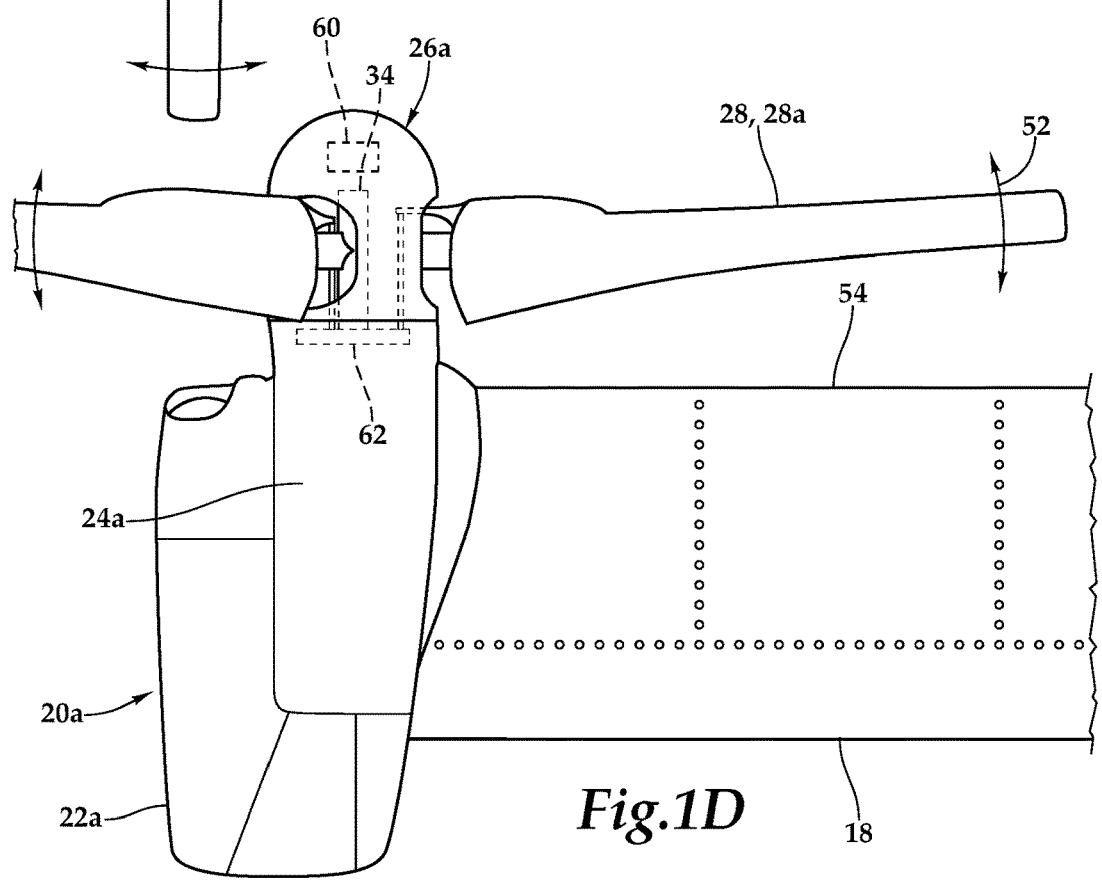

As best seen in FIGS. 1C-1D, proprotor assembly 26a allows both longitudinal flapping 50 and lateral flapping 52 of proprotor blade assemblies 28 when tiltrotor aircraft 10 is in airplane flight mode. When flapping longitudinally, as best seen in FIG. 1C, proprotor blade assemblies 28 generally flap about a horizontal axis, or an axis generally parallel to the pitch axis of tiltrotor aircraft 10. When flapping laterally, proprotor blade assemblies 28 generally flap about a vertical axis, or an axis generally parallel to the yaw axis of tiltrotor aircraft 10. Proprotor blade assemblies 28 may experience both longitudinal and lateral flapping 50, 52 such that proprotor disk 32a may tilt in any direction, including an upward, downward, outboard, inboard or diagonal direction. Proprotor assembly 26a may limit the maximum flapping angles of proprotor blade assemblies 28 by integrating hard stop structures therein. For example, hard stop structures of a gimbaled proprotor may limit the flapping angle of proprotor blade assemblies 28 to 5 degrees, 10 degrees, 12 degrees, 15 degrees or any other angle in the longitudinal direction, lateral direction or any other direction. Notwithstanding the use of hard stop structures, it may still be necessary to limit the flapping of proprotor blade assemblies 28 to below the maximum flapping angle allowed by the hard stop structures, such as when tiltrotor aircraft 10 is performing a maneuver in airplane flight mode. Limiting the flapping of proprotor blade assemblies 28 may be useful for gimbaled proprotors to prevent the gimbaled proprotor from tilting so far that it contacts mast 34 or other hardware within or adjacent to proprotor assembly 26a. As best seen in FIG. 1D, when proprotor blade assemblies 28 experience lateral flapping 52, an inboard proprotor blade assembly 28a is at risk of contacting leading edge 54 of wing 18. Propulsion assembly 20a is substantially similar to propulsion assembly 20b therefore, for sake of efficiency, certain features will be disclosed only with regard to propulsion assembly 20a. One having ordinary skill in the art, however, will fully appreciate an understanding of propulsion assembly 20b based upon the disclosure herein of propulsion assembly 20a.

To prevent these and other adverse effects of excessive flapping of proprotor blade assemblies 28, tiltrotor aircraft 10 implements a flapping control system 56 to control or reduce the flapping of proprotor blade assemblies 28 while tiltrotor aircraft 10 is in helicopter flight mode, airplane flight mode or conversion flight mode. Flapping control system 56 may be used to control flapping of proprotor blade assemblies 28 when tiltrotor aircraft 10 is in maneuver mode or steady state, or trim, mode. In steady state mode, the forces and moments acting upon tiltrotor aircraft 10, and in particular proprotor assemblies 26a, 26b, are approximately balanced during flight such that proprotor blade assemblies 28 experience steady state flapping based on the direction of airflow through proprotor disks 32a, 32b. Proprotor assemblies 26a, 26b, however, may be more prone to excessive flapping while tiltrotor aircraft 10 is in maneuver mode, particularly when tiltrotor aircraft 10 is in airplane flight mode or pylon assemblies 24a, 24b have low pylon angles, such as when pylon assemblies 24a, 24b form an angle in a range between 0 and 10 degrees from the horizontal orientation of airplane flight mode. The increased risk of excessive flapping in maneuver mode may be due to the dynamic effects, such as increased pitch rates, roll rates and accelerations, aerodynamic effects and larger transient forces across proprotor disks 32a, 32b that are present while tiltrotor aircraft 10 performs maneuvers, particularly in airplane flight mode. Flapping control system 56 includes a flapping control module 58, implemented by flight control computer 36, that implements one or more control laws to limit longitudinal and lateral flapping 50, 52 of proprotor blade assemblies 28 of proprotor assemblies 26a, 26b when tiltrotor aircraft 10 is in maneuver mode, including during aircraft flight mode, to prevent excessive flapping of proprotor blade assemblies 28 and any adverse effects stemming therefrom, including possible contact between inboard proprotor blade assembly 28a and leading edge 54 of wing 18.

In some embodiments, flapping control module 58 receives sensor data from sensors 46, which may include one or more flight parameters of tiltrotor aircraft 10. The sensor data may include proprotor flapping measurements from proprotor flapping sensors 60, which are measurements of the amount of longitudinal and/or lateral flapping of proprotor blade assemblies 28 of proprotor assemblies 26a, 26b. Flapping control module 58, which is in data communication with sensors 46, may use sensor data from sensors 46 to detect whether tiltrotor aircraft 10 is in maneuver mode. Flapping control module 58 may then identify or retrieve one or more maneuver flapping thresholds that are associated with the tiltrotor aircraft 10 being in maneuver mode. For example, flapping detection module 58 may identify a longitudinal maneuver flapping threshold in a range between 12 and 18 degrees, such as 15 degrees, and a lateral maneuver flapping threshold in a range between 7 and 13 degrees, such as 10 degrees, thereby allowing for the separate control of longitudinal and lateral flapping. Flapping control module 58 may then generate one or more swashplate commands using the proprotor flapping measurements and the maneuver flapping threshold(s). For example, flapping control module 58 may determine flapping errors for proprotor assemblies 26a, 26b by comparing the proprotor flapping measurements with a maneuver flapping threshold and then generate a swashplate command for each proprotor assembly 26a, 26b that corrects for the flapping error(s). Flight control computer 36 may then send the swashplate command(s) to either or both of the swashplate assemblies of proprotor assemblies 26a, 26b, such as swashplate assembly 62 of proprotor assembly 26a, thereby reducing either or both of the longitudinal or lateral flapping of proprotor blade assemblies 28 of proprotor assemblies 26a, 26b. By moving the swashplate assemblies using the swashplate command(s), flapping of proprotor blade assemblies 28 may be reduced to equal or less than the maneuver flapping threshold(s), thereby controlling the flapping of proprotor blade assemblies 28 when tiltrotor aircraft 10 is in maneuver mode.

It should be appreciated that tiltrotor rotorcraft 10 is merely illustrative of a variety of aircraft that can implement the embodiments disclosed herein. Indeed, flapping control system 56 may be utilized on any aircraft having rotor blades or proprotor blades. Other aircraft implementations can include helicopters, hybrid aircraft, tiltwing aircraft, quad tiltrotor aircraft, unmanned aircraft, gyrocopters, propeller airplanes and the like. As such, those skilled in the art will recognize that flapping control system 56 disclosed herein can be integrated into a variety of aircraft configurations. It should be appreciated that even though aircraft are particularly well-suited to implement the embodiments of the present disclosure, non-aircraft vehicles and devices can also implement the embodiments.

Figure 3:
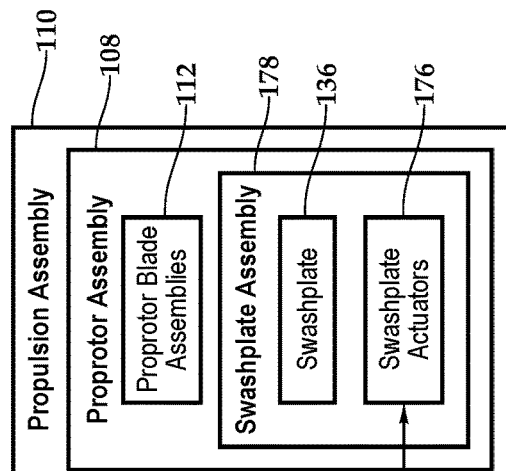
FIG. 3 is a schematic illustration of a flapping control system in accordance with embodiments of the present disclosure.
Figure 3:
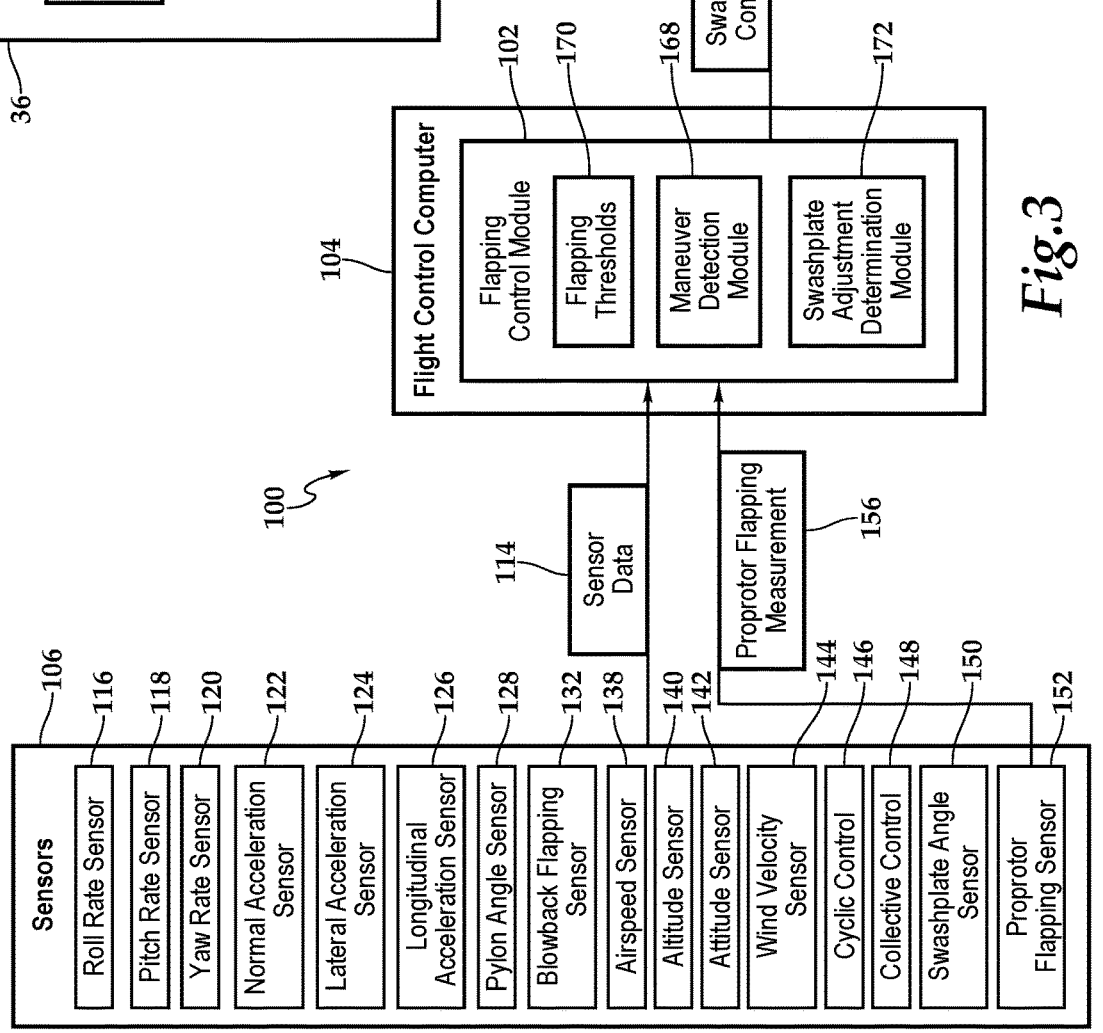
Figure 4A:
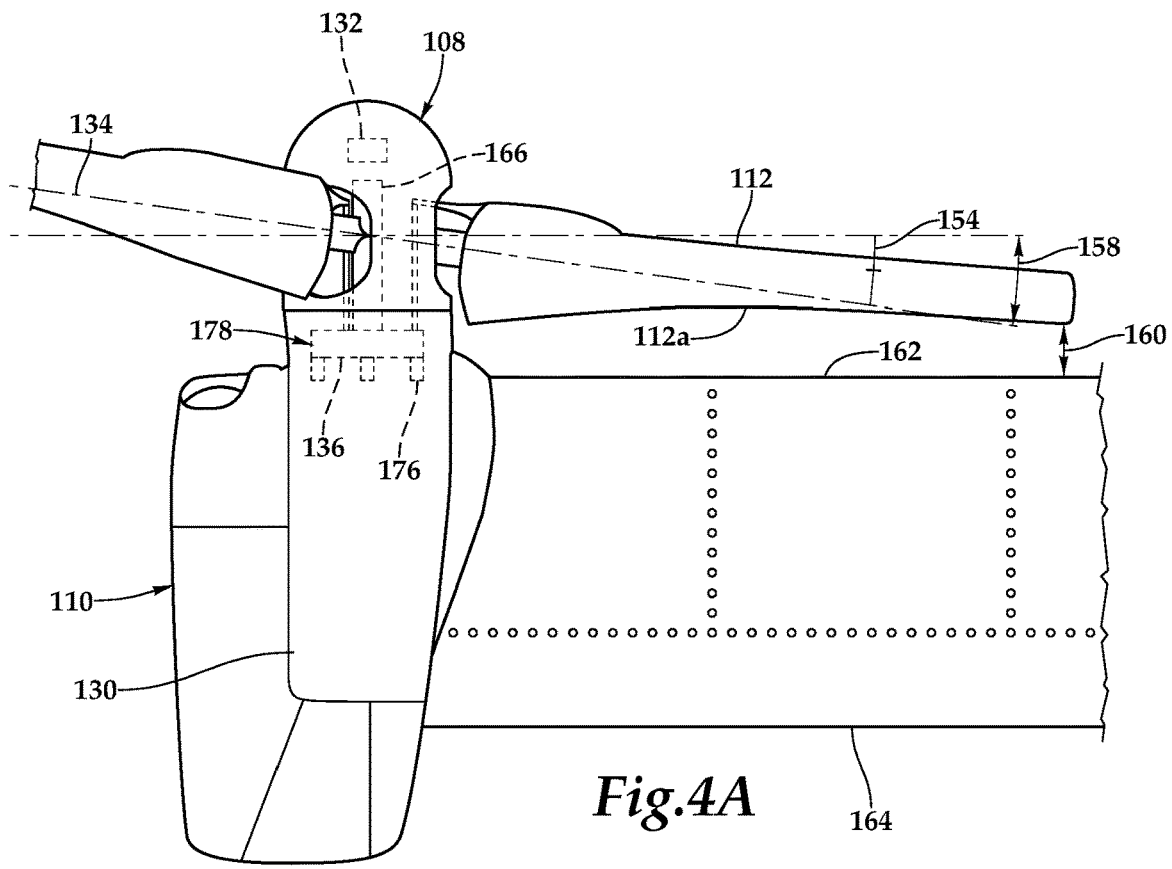
FIGS. 4A-4B are top views of a propulsion assembly having flapping proprotor blade assemblies in accordance with embodiments of the present disclosure.
Figure 4B:
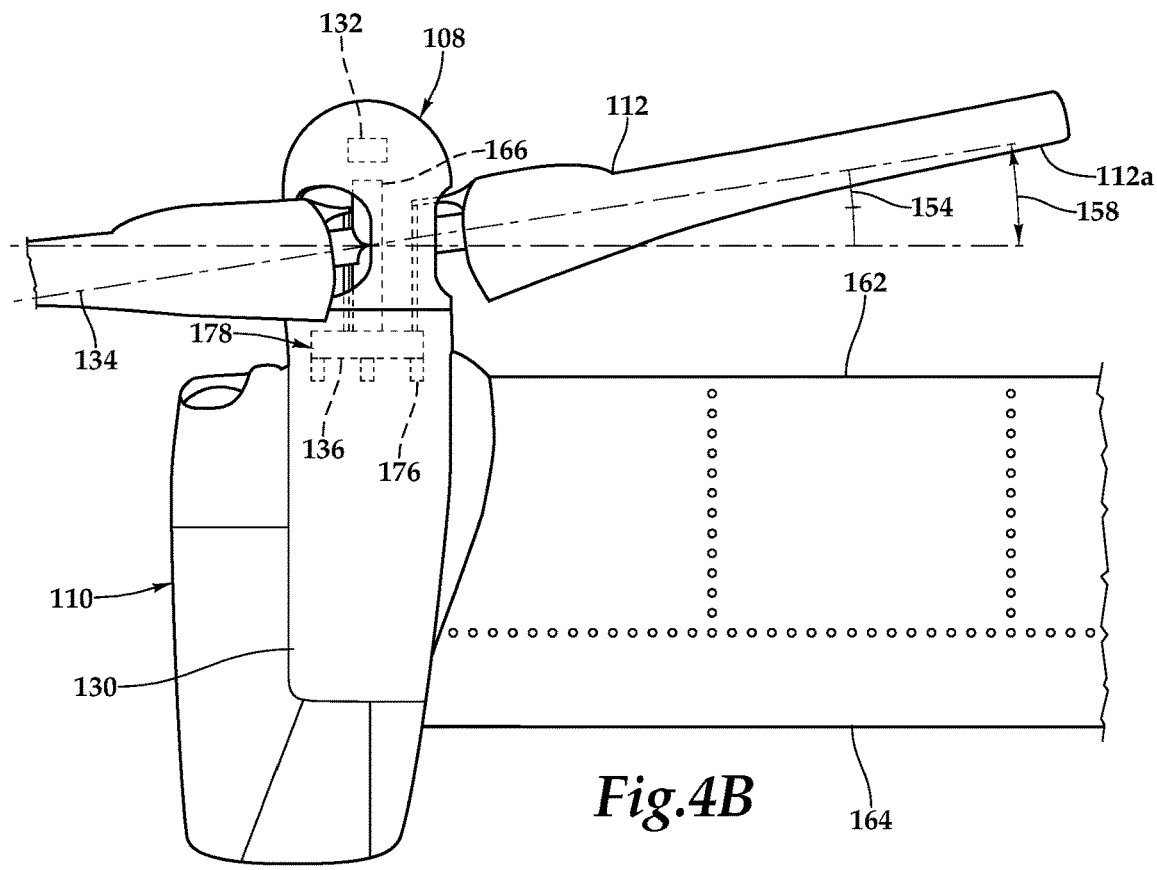

Referring to FIGS. 3 and 4A-4B in the drawings, a flapping control system for a tiltrotor aircraft is schematically illustrated and generally designated 100. Flapping control system 100 is implemented by a flapping control module 102 of a flight control computer 104, which is in data communication with sensors 106 and proprotor assembly 108 of a propulsion assembly 110. Flapping control module 102 implements one or more control laws to control the flapping of proprotor blade assemblies 112 in the longitudinal direction, lateral direction or a combination thereof. Sensors 106 are operable to detect flight parameters of the tiltrotor aircraft to form sensor data 114, which is then usable by flapping control module 102 to control the flapping of proprotor blade assemblies 112.

Sensors 106 may include a roll rate sensor 116, a pitch rate sensor 118 and/or a yaw rate sensor 120, which measure the roll, pitch and yaw rates of the tiltrotor aircraft, respectively. Sensors 106 may also include a normal acceleration, or g force, sensor 122, a lateral acceleration sensor 124 and/or a longitudinal acceleration sensor 126, which may measure acceleration of the tiltrotor aircraft in the vertical ($N_Z$), lateral ($N_Y$) and longitudinal ($N_X$) directions, respectively. Sensors 106 may also include a pylon angle sensor 128, which measures the pylon angle of pylon assembly 130. Sensors 106 may also include a blowback flapping sensor 132, which measures the angle at which proprotor disk 134 is flapping relative to swashplate 136. Sensors 106 may also include an airspeed sensor 138, an altitude sensor 140 and/or an attitude sensor 142, which measure the airspeed, altitude and attitude of the tiltrotor aircraft, respectively. Sensors 106 may also include a wind velocity sensor 144, which measures a wind velocity at or near the tiltrotor aircraft. Sensors 106 may also include a cyclic control sensor 146 and/or a collective control sensor 148, which measure the positions of the cyclic and collective controls in the cockpit of the tiltrotor aircraft, respectively. Sensors 106 may also include a swashplate angle sensor 150, which measures the angle at which swashplate 136 is positioned. Sensors 106 may also include a proprotor flapping sensor 152, which measures a flapping angle 154 of proprotor blade assemblies 112 in the longitudinal and/or lateral directions to form a proprotor flapping measurement 156. Instead of, or in combination with, measuring flapping angle 154, proprotor flapping sensor 152 may measure a flapping distance 158 that any point along proprotor blade assemblies 112 has flapped. Additional sensors may be included in sensors 106 or any combination of any portion of sensors 106 may be included in flapping control system 100.

As best seen in FIGS. 4A-4B, when proprotor blade assemblies 112 flap at flapping angle 154, proprotor disk 134 will tend to tilt in a particular direction by flapping angle 154. In FIG. 4A, proprotor blade assemblies 112 have a flapping angle 154 such that proprotor disk 134 is tilted in the inboard direction by flapping angle 154. In FIG. 4B, proprotor blade assemblies 112 have a flapping angle 154 such that proprotor disk 134 is tilted in the outboard direction by flapping angle 154. When proprotor disk 134 flaps in the inboard direction, as shown in FIG. 4A, inboard proprotor blade assembly 112a has a smaller distance 160 from leading edge 162 of wing 164 than when flapping angle 154 is 0 degrees and proprotor disk 134 is substantially perpendicular to mast 166. Flapping control system 100 may be utilized to prevent distance 160 between inboard proprotor blade assembly 112a and leading edge 162 of wing 164 from becoming so small that contact between the two structures is possible.

Flapping control module 102 includes a maneuver detection module 168 that uses sensor data 114 to determine whether the tiltrotor aircraft is in a steady state mode or a maneuver mode. The maneuver mode of the tiltrotor aircraft is typically associated with a change in one or more of the flight parameters detected by sensors 106. For example, if proprotor flapping sensor 152 and pitch rate sensor 118 detect high absolute or relative values for proprotor flapping and pitch rate for the tiltrotor aircraft, maneuver detection module 168 may determine that the tiltrotor aircraft is in maneuver mode. Increased airspeed detected by airspeed sensor 138 or an increased g force detected by normal acceleration sensor 122 may also cause maneuver detection module 168 to determine that the tiltrotor aircraft is in maneuver mode. The following are non-limiting examples of maneuvers that may be performed by the tiltrotor aircraft, and which may trigger maneuver detection module 168 to determine that the tiltrotor aircraft is in maneuver mode: zoom climb, steep climb, dive, falling leaf, torque roll, vertical up, 45 degree up line, inside loop, outside loop, bell tailslide, dive, snap roll, flick roll, erect spin, inverted spin, flat spin, wingover, chandelle, Cuban eight, lazy eight, hammerhead, split "S", scissors, combat maneuvers, rescue maneuvers, reconnaissance maneuvers or variations or combinations of any of the aforementioned, as well as any other tiltrotor aircraft maneuvers with the potential to cause excessive flapping of proprotor assembly 108.

By analyzing sensor data 114, maneuver detection module 168 may also determine that the tiltrotor aircraft is in maneuver mode by anticipating performance of a maneuver by the tiltrotor aircraft. For example, maneuver detection module 168 may determine that the tiltrotor aircraft is in maneuver mode based on the relative or absolute positions of the cyclic and/or collective controls in the cockpit of the tiltrotor aircraft as measured by cyclic and collective control sensors 146, 148, such as when the pilot pulls hard on one of these controls to perform a maneuver in airplane mode. The ability to anticipate maneuvers enables early detection of potential aerodynamic or other forces that may cause excessive flapping of proprotor blade assemblies 112, and therefore enables flapping control module 102 to limit such flapping before risking any structural damage.

If maneuver detection module 168 determines that the tiltrotor aircraft is in steady state mode, flapping control module 102 may identify or retrieve a steady state flapping threshold from flapping thresholds 170. For example, the steady state flapping threshold may be at or near 0 degrees, in both the longitudinal and lateral directions, to maintain a suitable thrust vector in the forward direction while the tiltrotor aircraft is in airplane mode. Conversely, if maneuver detection module 168 determines that the tiltrotor aircraft is in maneuver mode, flapping control module 102 may identify or retrieve a maneuver flapping threshold associated with the maneuver mode from flapping thresholds 170. For example, the maneuver flapping threshold may be in a range between 5 and 10 degrees, such as 8 degrees, to limit flapping angle 154 of proprotor blade assemblies 112 by this threshold angle.

As discussed above, when proprotor assembly 108 experiences flapping, proprotor disk 134 may tilt in a particular direction such as in an inboard, outboard, upward or downward direction. The maneuver flapping threshold may have one or more components to limit the tilting of proprotor disk 134 in particular directions. For example, the maneuver flapping threshold may include longitudinal and lateral components, wherein the longitudinal maneuver flapping threshold limits longitudinal flapping of proprotor blade assemblies 112 and the lateral maneuver flapping threshold limits lateral flapping of proprotor blade assemblies 112. The longitudinal maneuver flapping threshold may differ from the lateral maneuver flapping threshold. For example, the lateral maneuver flapping threshold may be less than the longitudinal maneuver flapping threshold due to the proximity of inboard proprotor blade assembly 112a to leading edge 162 of wing 164. It may also be desired to limit inboard tilting of proprotor disk 134, as shown in FIG. 4A, more than outboard tilting of proprotor disk 134, as shown in FIG. 4B. To further refine flapping control, the lateral maneuver flapping threshold may include inboard and outboard components and the longitudinal maneuver flapping threshold may include upward and downward components. Thus, in some embodiments, the inboard lateral maneuver flapping threshold may be less than the outboard lateral maneuver flapping threshold so that the angle by which proprotor disk 134 may tilt inboard is more limited than the angle by which proprotor disk 134 may tilt outboard.

In some embodiments, the maneuver flapping threshold may vary based on sensor data 114. For example, flapping control module 102 may identify a maneuver flapping threshold in a range between 5 and 8 degrees depending on the measurements of roll rate sensor 116 and pitch rate sensor 118. In this example, roll and pitch rates on the lower end of a predefined spectrum may cause flapping control module 102 to identify a maneuver flapping threshold on the lower end of the range, and sufficiently elevated roll and pitch rates may cause flapping control module 102 to identify a maneuver flapping threshold on the higher end of the range. Thus, the maneuver flapping threshold may be proportional to the roll and pitch rates measured by roll and pitch rate sensors 116, 118 so that more load-inducing maneuvers are given more flapping allowance. Flapping control module 102 may use the flight parameters detected by any of sensors 106 to vary the maneuver flapping threshold in a proportional, inversely proportional or other manner. The maneuver flapping threshold may also vary based on the type or complexity of the maneuver detected by maneuver detection module 168. For example, if maneuver detection module 168 detects that the tiltrotor aircraft is performing, or will perform, a type of maneuver that is particularly susceptible to excessive flapping of proprotor blade assemblies 112, flapping control module 102 may identify an elevated maneuver flapping threshold to give proprotor blade assemblies 112 more flapping allowance to perform the maneuver while still preventing proprotor blade assemblies 112 from excessive or dangerous flapping.

Proprotor flapping measurement 156 and the maneuver flapping threshold identified or retrieved from flapping thresholds 170 may be compared or summed to determine a flapping error. To determine the flapping error in steady state mode, proprotor flapping measurement 156 is compared or summed with a steady state flapping threshold. In response to, during or in anticipation of maneuver detection module 168 determining that the tiltrotor aircraft is in maneuver mode, a swashplate adjustment determination module 172 may generate one or more swashplate commands 174 using the flapping error, proprotor flapping measurement 156, a maneuver flapping threshold or other parameters. Swashplate command 174 includes instructions for swashplate actuators 176 to adjust swashplate 136. Proprotor disk 134 may then follow the adjustment of swashplate 136 to reduce or control the flapping of proprotor blade assemblies 112. For example, swashplate command 174 may adjust swashplate 136 such that the flapping error is reduced to about 0 degrees or flapping angle 154 of proprotor blade assemblies 112 is reduced to equal or less than the maneuver flapping threshold.

Swashplate adjustment determination module 172 may also use sensor data 114 when generating swashplate command 174. For example, swashplate adjustment determination module 172 may take into account blowback flapping detected by blowback flapping sensor 132. While each degree of swashplate adjustment may still translate to 1 degree of flapping adjustment for proprotor blade assemblies 112 when proprotor blade assemblies 112 experience blowback flapping, blowback flapping sensor 132 provides a measurement of the blowback bias to be taken into account by swashplate adjustment determination module 172 when generating swashplate command 174, thereby preventing swashplate adjustment determination module 172 from overcompensating for any flapping error. Swashplate adjustment determination module 172 may also take into account any control power limiting schemes, which may be affected by sensor data 114, when generating swashplate command 174. Swashplate command 174 may also include a longitudinal component and a lateral component to provide for both longitudinal and lateral adjustment of swashplate 136.

After generating swashplate command 174, flapping control module 102 sends swashplate command 174 to swashplate assembly 178 to reduce flapping of proprotor blade assemblies 112. Because swashplate command 174 is sent to swashplate actuators 176, which control movement of swashplate 136, swashplate command 174 may be converted from a degree or angle adjustment in either or both of the longitudinal or lateral directions into the distance each actuator 176 must move to achieve the desired swashplate angle. If swashplate actuators 176 are linear actuators, swashplate command 174 may include the distance that each linear swashplate actuator 176 must move to achieve the desired angle of swashplate 136. For example, if swashplate 136 is to be moved 5 degrees laterally inboard and is controlled by three linear and circumferential actuators 176, as illustrated in FIGS. 4A and 4B, swashplate command 174 may include instructions to lower the inboard actuator by a predetermined distance and raise the other two actuators by a predetermined distance.

Flapping control system 100 is not limited to controlling flapping angle 154 only while the tiltrotor aircraft is in airplane flight mode. For example, when the tiltrotor aircraft is in steady state forward flight, flapping angle 154 may be held at about 0 degrees by flapping control system 100 using a steady state flapping threshold of 0 degrees to maintain a suitable thrust vector in the forward direction. In this example, during forward steady state flight, proprotor flapping sensor 152 may detect that the proprotor blade assemblies 112 are flapping outboard by 2 degrees and aft by 2 degrees. If the steady state flapping threshold is at or near 0 degrees, flapping control module 102 may generate swashplate command 174 that tilts swashplate 136 inboard by 2 degrees and forward by 2 degrees to correct the flapping error and reduce flapping angle 154 to approximately 0 degrees.

In some embodiments, maneuver detection module 168 may also be operable to identify a proportional relationship between one or more of the flight parameters of sensor data 114 and the flapping of proprotor blade assemblies 112. Swashplate adjustment determination module 172 may then generate swashplate command 174 based on such proportional relationship. For example, if flapping control module 102 identifies a proportional relationship in which a pitch rate of 5 degrees per second causes a 1 degree flap of proprotor blade assemblies 112, flapping control module 102 can anticipate and correct such flapping by adjusting swashplate 136 by 1 degree, in any suitable direction, in response to maneuver detection module 168 detecting a 5 degree per second pitch rate from pitch rate sensor 118. Recognizing and correcting such proportional relationships allows flapping control system 100 to keep proprotor blade assemblies 112 within acceptable flapping thresholds. Proportional relationships between sensor data 114 from other sensors 106 and the flapping of proprotor blade assemblies 112 may also be recognized by flapping control module 102 to improve the flapping control capabilities thereof.

It will be appreciated by one of ordinary skill in the art that although a single propulsion assembly 110 is illustrated in FIGS. 3 and 4A-4B, flapping control system 100 may be used to control the flapping on two or more propulsion assemblies, each of which may receive separate and independently-generated swashplate commands to control the flapping of the respective proprotor blade assemblies thereon. The illustrative embodiments help to prevent contact between proprotor blade assemblies 112 and leading edge 162 of wing 164. The illustrative embodiments also prevent gimbaled or teetering proprotor assemblies from exceeding their clearance so that the proprotor hub and associated components do not flap into direct contact with surrounding structure, such as mast 166. Thus, the illustrative embodiments may allow for a pilot to conduct more "care-free" maneuvering when piloting the tiltrotor aircraft.

Figure 5:
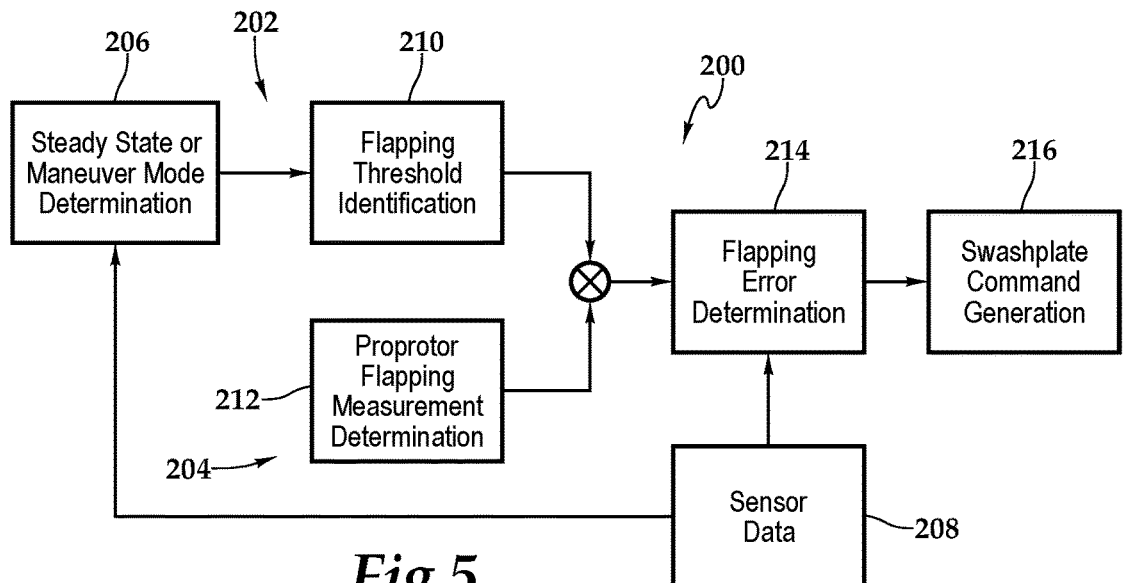
FIG. 5 is a schematic illustration of a control law implementing a flapping control system in accordance with embodiments of the present disclosure.

Referring to FIG. 5 of the drawings, a control law for controlling flapping of the proprotor blade assemblies of a tiltrotor aircraft is schematically illustrated and generally designated 200. Control law 200 may be implemented by the flight control computer of a tiltrotor aircraft, such as flight control computer 104 in FIG. 3. Control law 200 initiates from two branches: a commanded flapping determination 202 and an actual flapping determination 204. At steady state or maneuver mode determination 206, sensor data 208 and other logic may be used to determine whether the tiltrotor aircraft is in a steady state mode or maneuver mode. At flapping threshold identification 210, a flapping threshold is identified based on whether the tiltrotor aircraft is in steady state mode or maneuver mode. For example, if the tiltrotor aircraft is in steady state mode, flapping thresholds of 0 degrees may be identified in both the longitudinal and lateral directions. If the tiltrotor aircraft is determined to be in maneuver mode, some allowance may be made for flapping and therefore the maneuver flapping threshold may be greater than zero in both the longitudinal and lateral directions. The maneuver flapping threshold may take into account flight parameters from sensor data 208. For example, more extreme maneuvers may have a higher maneuver flapping threshold to provide more flapping allowance. At actual flapping determination branch 204, a proprotor flapping measurement may be determined in either or both of the longitudinal or lateral directions at proprotor flapping measurement determination 212. The proprotor flapping measurement may be made by a proprotor flapping sensor.

At flapping error determination 214, the commanded and actual flapping determinations 202, 204 may be compared or summed to determine a flapping error. Once a flapping error is determined, one or more factors or variables may be used to determine the swashplate command at swashplate command generation 216. For example, a flapping control module may identify a proportional control gain and generate a swashplate command using the proportional control gain. The proportional control gain may apply a control gain that is directly or inversely proportional to the flapping error. For example, if the flapping error is 10%, the proportional control gain may likewise be applied to the swashplate at 10% to prevent the flapping error from increasing. The flapping control module may also identify an integral control gain and generate the swashplate command using the integral control gain. The integral control gain may apply control gain that reduces the flapping error back to 0 degrees since the proportional control gain alone may be insufficient to do so. Either or both of the proportional control gain and the integral control gain may be applied to the flapping error to determine the swashplate command at swashplate command generation 216. For example, control gains may be applied to the flapping error in any of the following ways: $E \times K_p \times K_i$, $E \times K_p$ or $E \times K_i$, wherein E is the flapping error, $K_p$ is the proportional control gain and $K_i$ is the integral control gain.

The proportional and integral control gains may vary to achieve a flapping angle that is within suitable thresholds without driving the proprotor assembly to an "over-twitchy" or unstable mode. For example, increasing the proportional control gain too high may unnecessarily shake the proprotor blade assemblies. Thus, phase and gain margins may be set based on dynamic stability. Either or both of the proportional or integral control gains may also vary based on sensor data 208. For example, if an airspeed sensor detects a low airspeed, the proportional and integral control gains may be smaller than for higher airspeeds to provide a more gradual flapping correction. In another example, proportional and integral control gains may be adjusted based on the pylon angle and airspeed.

The swashplate command may also be determined at swashplate command generation 216 using control power limiting schemes that, for example, take into account sensor data 208 such as a blowback flapping measurement or angle, thereby preventing the swashplate command from overcompensating for the actual flapping of the proprotor assembly. Swashplate command generation 216 may also take into account any anticipated maneuvers derived from sensor data 208, such as any proportional relationships identified between sensor data 208 and the flapping of the proprotor blade assemblies. The swashplate command generated by swashplate command generation 216 may include longitudinal and/or lateral components, as well as movement instructions to swashplate actuators to change the angle of the swashplate by a suitable amount. The swashplate command generated by control law 200 reduces or eliminates the flapping error of the proprotor blade assemblies.

Figure 6:
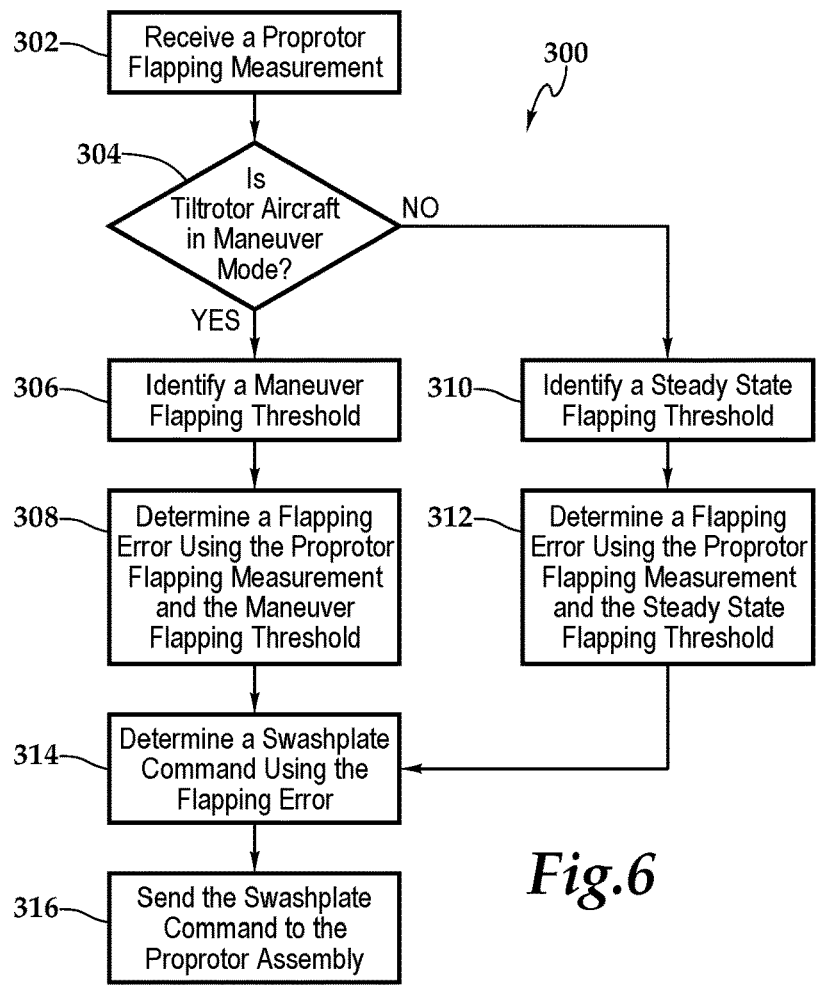
FIG. 6 is a flowchart of a method for controlling flapping of a proprotor assembly of a tiltrotor aircraft in accordance with embodiments of the present disclosure.

Referring to FIG. 6 in the drawings, a method for controlling flapping for a proprotor assembly of a tiltrotor aircraft is illustrated as flowchart 300. The method includes receiving a proprotor flapping measurement, which may be determined by a proprotor flapping sensor (step 302). The method includes determining whether the tiltrotor aircraft is in maneuver mode (step 304). In certain embodiments, determining that the tiltrotor aircraft is in maneuver mode may include detecting that the tiltrotor aircraft is in maneuver mode using sensor data from one or more sensors. Also, determining that the tiltrotor aircraft is in maneuver mode may include anticipating the maneuver mode using sensor data from one or more sensors. If the method determines that the tiltrotor aircraft is in maneuver mode, the method identifies a maneuver flapping threshold (step 306), and determines a flapping error using the proprotor flapping measurement and the maneuver flapping threshold (step 308). In some embodiments, identifying the maneuver flapping threshold may include identifying at least one of a longitudinal maneuver flapping threshold or a lateral maneuver flapping threshold. If the method determines that the tiltrotor aircraft is not in maneuver mode, but is instead in steady state mode, the method identifies a steady state flapping threshold (step 310), and determines a flapping error using the proprotor flapping measurement and the steady state flapping threshold (step 312).

The method then determines a swashplate command using the flapping error (step 314). In some embodiments, determining the swashplate command using the flapping error may include determining the swashplate command using sensor data from one or more sensors. In other embodiments, determining the swashplate command using the flapping error may include determining the swashplate command using a proportional control gain and an integral control gain. In these embodiments, the method may include determining either or both of the proportional control gain or the integral control gain using sensor data from one or more sensors. In some embodiments, the method may include identifying a proportional relationship between flapping of the proprotor assembly and one or more parameters of the sensor data from one or more sensors. In this embodiment, the method may determine the swashplate command using the proportional relationship. The method sends the swashplate command to the proprotor assembly (step 316), thereby reducing flapping of the proprotor blade assemblies of the tiltrotor aircraft. In certain embodiments, sending the swashplate command may include sending the swashplate command to a swashplate assembly to reduce flapping of the proprotor blade assemblies. In other embodiments, sending the swashplate command to the proprotor assembly may include sending the swashplate command to the proprotor assembly to reduce the flapping error to substantially zero.

The flowcharts and block diagrams in the depicted embodiments illustrate the architecture, functionality and operation of some possible implementations of apparatus, methods and computer program products. In this regard, each block in the flowchart or block diagrams may represent a module, segment or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. Unless otherwise indicated, as used herein, "or" does not require mutual exclusivity. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A flapping control system for a proprotor assembly of a tiltrotor aircraft comprising:
   one or more sensors operable to detect one or more flight parameters of the tiltrotor aircraft to form sensor data, the one or more sensors including a proprotor flapping sensor operable to detect a proprotor flapping measurement; and
   a flapping control module in data communication with the one or more sensors, the flapping control module including a maneuver detection module operable to detect whether the tiltrotor aircraft is in a maneuver mode using the sensor data, the flapping control module operable to identify a maneuver flapping threshold associated with the maneuver mode;
   wherein the flapping control module is further operable to generate a swashplate command using the proprotor flapping measurement and the maneuver flapping threshold and send the swashplate command to the proprotor assembly to reduce flapping of the proprotor assembly.

2. The flapping control system as recited in claim 1 wherein the one or more sensors further comprise at least one sensor selected from the group consisting of a roll rate sensor, a pitch rate sensor, a yaw rate sensor, a normal acceleration sensor, a blowback flapping sensor and an airspeed sensor.

3. The flapping control system as recited in claim 1 wherein the maneuver detection module is further operable to detect that the tiltrotor aircraft is in the maneuver mode in response to anticipating performance of a maneuver by the tiltrotor aircraft using the sensor data.

4. The flapping control system as recited in claim 1 wherein the maneuver detection module is further operable to identify a proportional relationship between one or more flight parameters of the sensor data and flapping of the proprotor assembly; and
wherein the flapping control module is further operable to generate the swashplate command using the proportional relationship.

5. The flapping control system as recited in claim 1 wherein the maneuver flapping threshold further comprises a longitudinal component and a lateral component, the longitudinal maneuver flapping threshold differing from the lateral maneuver flapping threshold.

6. The flapping control system as recited in claim 5 wherein the lateral maneuver flapping threshold is less than the longitudinal maneuver flapping threshold.

7. The flapping control system as recited in claim 5 wherein the lateral maneuver flapping threshold further comprises inboard and outboard components and wherein the inboard lateral maneuver flapping threshold is less than the outboard lateral maneuver flapping threshold.

8. The flapping control system as recited in claim 1 wherein the flapping control module is further operable to determine a flapping error using the proprotor flapping measurement and the maneuver flapping threshold and wherein the flapping control module is further operable to generate the swashplate command using the flapping error.

9. The flapping control system as recited in claim 1 wherein the flapping control module is further operable to identify at least one of a proportional control gain used in generating the swashplate command or an integral control gain used in generating the swashplate command.

10. The flapping control system as recited in claim 1 wherein the swashplate command reduces the flapping of the proprotor assembly to equal or less than the maneuver flapping threshold.

11. A tiltrotor aircraft comprising:
a fuselage;
a wing coupled to the fuselage;
at least one propulsion assembly coupled to the wing, the at least one propulsion assembly each including a proprotor assembly;
one or more sensors operable to detect one or more flight parameters of the tiltrotor aircraft to form sensor data, the one or more sensors including a proprotor flapping sensor operable to detect a proprotor flapping measurement; and
a flight control computer including a flapping control module in data communication with the one or more sensors, the flapping control module including a maneuver detection module operable to detect whether the tiltrotor aircraft is in a maneuver mode using the sensor data, the flapping control module operable to identify a maneuver flapping threshold associated with the maneuver mode;
wherein the flapping control module is further operable to generate a swashplate command using the proprotor flapping measurement and the maneuver flapping threshold and send the swashplate command to the proprotor assembly to reduce flapping of the proprotor assembly.

12. The tiltrotor aircraft as recited in claim 11 wherein the proprotor assembly further comprises a plurality of proprotor blade assemblies; and
wherein the proprotor flapping sensor is further operable to measure a flapping angle of the proprotor blade assemblies to form the proprotor flapping measurement.

13. The tiltrotor aircraft as recited in claim 11 wherein the at least one propulsion assembly includes a pylon assembly movable between a generally vertical orientation in helicopter flight mode and a generally horizontal orientation in airplane flight mode, the pylon assembly including the proprotor assembly, the proprotor assembly including a plurality of proprotor blade assemblies; and
wherein the flapping control module is further operable to reduce flapping of the proprotor blade assemblies while the tiltrotor aircraft is in the airplane mode to prevent contact between the proprotor blade assemblies and the wing.

14. The tiltrotor aircraft as recited in claim 11 wherein the maneuver detection module is further operable to detect whether the tiltrotor aircraft is in one of a steady state mode or the maneuver mode.

15. The tiltrotor aircraft as recited in claim 11 wherein the wing further comprises first and second outboard ends respectively having first and second propulsion assemblies coupled thereto and wherein the flapping control module is operable to reduce flapping of the proprotor assemblies for the first and second propulsion assemblies.

16. A method for controlling flapping of a proprotor assembly of a tiltrotor aircraft comprising:
receiving a proprotor flapping measurement from a proprotor flapping sensor;
identifying a maneuver flapping threshold in response to detecting that the tiltrotor aircraft is in a maneuver mode;
determining a flapping error using the proprotor flapping measurement and the maneuver flapping threshold;
determining a swashplate command using the flapping error; and
sending the swashplate command to the proprotor assembly to reduce flapping of the proprotor assembly.

17. The method as recited in claim 16 wherein identifying the maneuver flapping threshold further comprises identifying at least one of a longitudinal maneuver flapping threshold or a lateral maneuver flapping threshold.

18. The method as recited in claim 16 wherein detecting that the tiltrotor aircraft is in the maneuver mode further comprises at least one of detecting that the tiltrotor aircraft is in the maneuver mode using sensor data from one or more sensors or anticipating the maneuver mode using sensor data from one or more sensors.

19. The method as recited in claim 16 wherein determining the swashplate command further comprises at least one of determining the swashplate command using sensor data from one or more sensors, determining the swashplate command using a proportional control gain or determining the swashplate command using an integral control gain.

20. The method as recited in claim 16 further comprising identifying a proportional relationship between flapping of the proprotor assembly and one or more parameters of sensor data from one or more sensors and determining the swashplate command based on the proportional relationship.

21. The method as recited in claim 16 wherein sending the swashplate command to the proprotor assembly to reduce flapping of the proprotor assembly further comprises sending the swashplate command to the proprotor assembly to reduce the flapping error to substantially zero.

\* \* \* \* \*